SR
SEARCH RCPT
RE 26,615

June 24, 1969 F. M. WILLBRANDT Re. 26,615

METHOD OF WRAPPING ARTICLES OR PACKAGES

Original Filed April 7, 1961 Sheet 1 of 2

INVENTOR.
Franklin M. Willbrandt
BY
Austin A. Webb
ATTORNEY.

METHOD OF WRAPPING ARTICLES OR PACKAGES
Original Filed April 7, 1961 
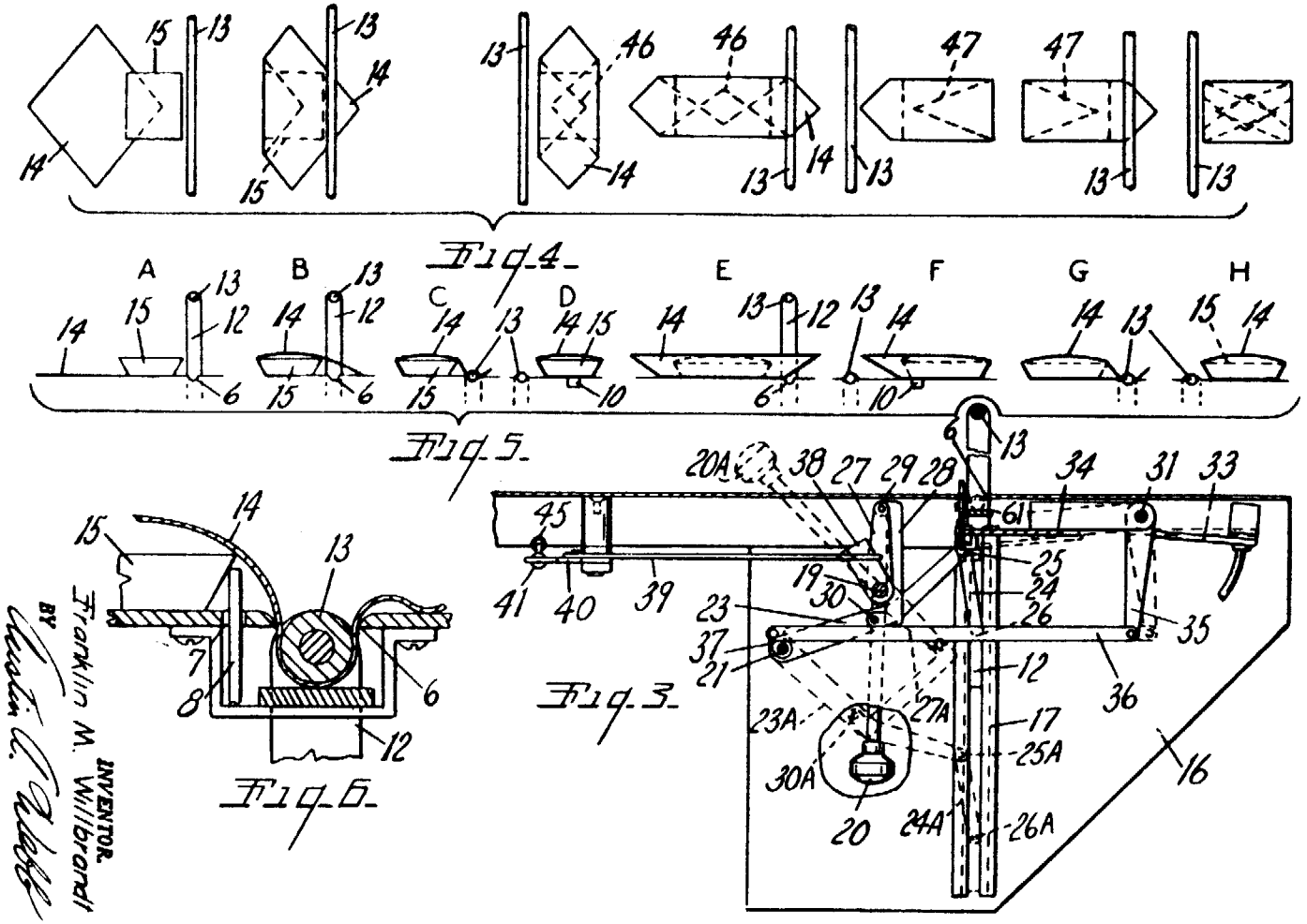
INVENTOR.
Franklin M. Willbrandt
BY
Austin A. Webb
ATTORNEY United States Patent Office Re. 26,615
Reissued June 24, 1969

26,615

METHOD OF WRAPPING ARTICLES OR PACKAGES

Franklin M. Willbrandt, Battle Creek, Mich., assignor to Battle Creek Packaging Machines, Inc., Battle Creek, Mich.

Original No. 3,287,876, dated Nov. 29, 1966, Ser. No. 306,475, Sept. 4, 1963, which is a division of Ser. No. 101,543, Apr. 7, 1961, now Patent No. 3,112,589, dated Dec. 3, 1963. Application for reissue Sept. 13, 1968, Ser. No. 763,431

Int. Cl. B65b *11/48*

U.S. Cl. 53—31 9 Claims

Matter enclosed in heavy brackets [ ] appears in the original patent but forms no part of this reissue specification; matter printed in italics indicates the additions made by reissue.

[This invention relates to improvements in Method of Wrapping Articles or Packages. This application is a divisional of my copending application, Serial No. 101,543, filed April 7, 1961 for Semi-automatic Package Wrapping Machine, now Patent Number 3,112,589, dated December 3, 1963. The principal objects of this invention are:]

[First, to provide a method of wrapping articles or packages in which a sheet of wrapping material is placed on a support and the article or package is placed with its bottom partially overlapping a first edge of the sheet after which the remainder of the sheet is folded up and over the top and down the opposite side of the sheet and held temporarily while the article and the overwrapped portion of the sheet are moved relative to the held portion of the sheet and over the held portion to fold and release the held portion under the bottom of the article and the first edge of the sheet into a tubular wrap, after which end tucks and folds may be formed in the ends of the tubular wrap.]

[Second, to provide a method of wrapping an article in which the article once placed on an edge of the wrapper sheet, needs to be moved only in a single plane to complete a tubular wrap around the article so that the article on the sheet holds the sheet in its initially underlapped relation to the article and the movement of the article and sheet completes the second underlap and tubular wrap of the sheet.]

[Third, to provide a novel procedure of making a second and final underlapping fold in a wrapper sheet to complete a tubular wrap by holding the terminal end of the sheet and advancing the partially wrapped article over the held portion thus pulling the terminal end under the article and applying a tension in the sheet while the advancing force on the partially wrapped package applies an opposite tensioning force to the wrapper.]

ABSTRACT OF THE DISCLOSURE

*A flat article support receives a wrapper sheet. An article to be wrapped is placed on the support and lapped over the leading edge of the sheet. The trailing portion of the sheet is folded forwardly over the top and down in front of the article. A holding bar is moved into restraining engagement with the overfolded portion of the sheet in front of, and below the article, while the article and the lapped portion of the sheet are moved manually forwardly on the support over the restrained portion of the sheet to move the overfolded end under the leading ends of the article and the sheet, and pull the overfolded end of the sheet out of engagement with the holding bar.*

RELATED APPLICATIONS

*This application is for reissue of Patent Number 3,287,876 dated Nov. 29, 1966, the application for which was divided from application Ser. No. 101,543, filed Apr. 7, 1961, and which is now Patent No. 3,112,589, issued Dec. 3, 1963.*

OUTLINE OF INVENTION

*The invention provides a method of packaging or wrapping articles in which the main or first wrap around the article formed by placing the article in overlapped and projecting relation to the leading edge of a wrapper sheet, and then folding the trailing portion of the sheet over the back, top and front of the article. The overfolded and initially trailing end of the sheet is then held or restrained, below the level of the article, while the article and the overfolded portions of the sheet are moved horizontally relative to the restrained end of the sheet to bring the ends of the sheet into lapped relation against the bottom of the article.*

*The wrapping procedure permits the article to be supported at all times while forming the initial wrap by a single horizontal movement of the article.*

Other objects and advantages of the invention will be apparent from a consideration of the following description and claims. The drawings, of which there are two sheets, illustrate the several steps of the method of wrapping claimed herein as well as one form of a machine for performing the method as claimed in the above identified application and patent.

FIGURE 3 is a fragmentary vertical cross sectional view taken along the plane of the lines 3—3 in FIGURE 2.

FIGURE 4 is a schematic or diagrammatical view showing the several stages or steps in the progressive wrapping of a package with the machine of the invention. The view shows the package and wrapper in plan views.

FIGURE 5 is a conventional or schematic view of the wrapping steps shown in side elevation with corresponding steps projected from FIGURE 4. The several successive steps in FIGURES 4 and 5 are identified by the letters A through H as corresponding sections of FIGURES 4 and 5.

FIGURE 6 is an enlarged fragmentary vertical cross sectional view through the wrapper sheet retaining roller and showing a wrapper in operative position relative to a package being wrapped.

Figure 1:
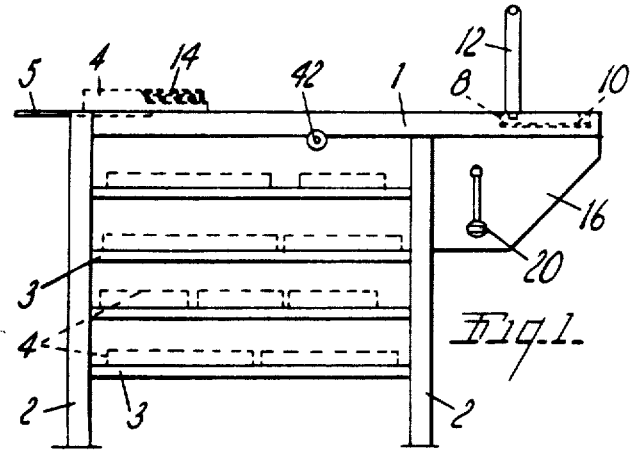
FIGURE 1 is a side elevational view of the wrapping mechanism.
Figure 2:
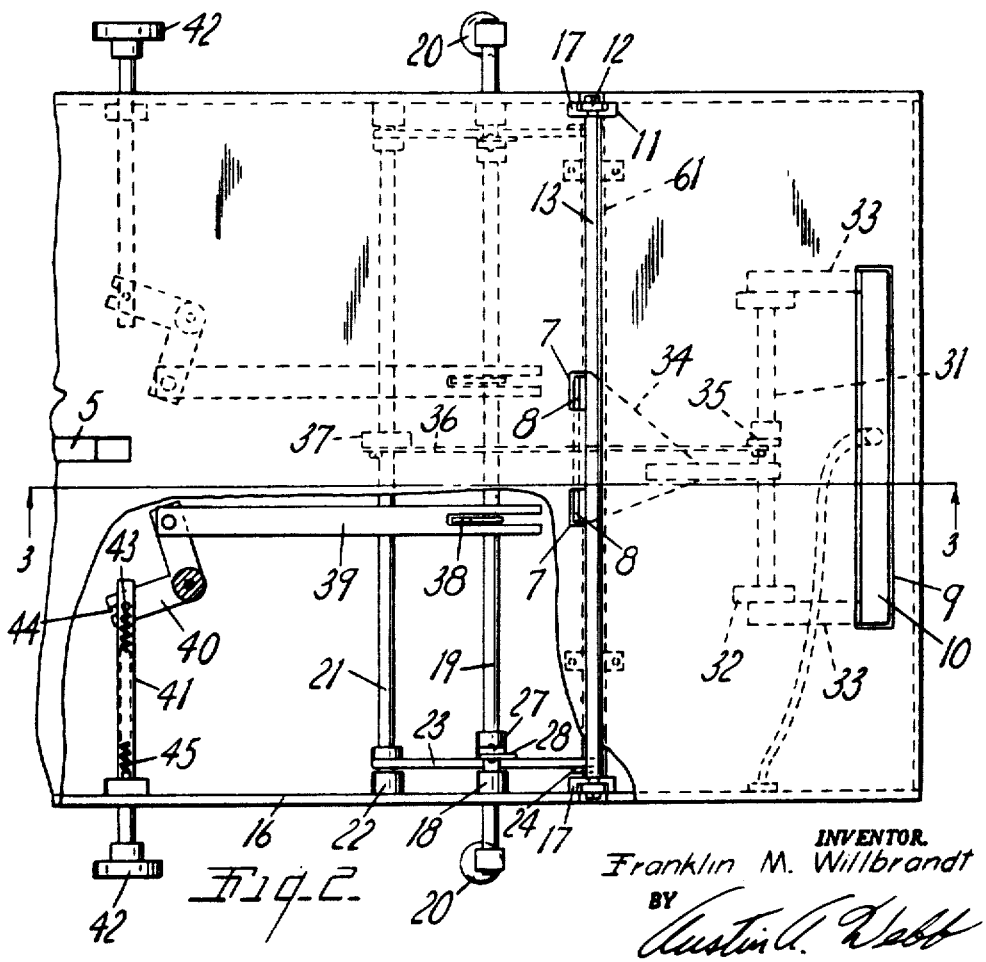
FIGURE 2 is a fragmentary enlarged plan view of the mechanism with a portion of the top broken away to illustrate operating connections therebelow.

The wrapping mechanism is built into a table having a flat top 1 supported upon suitable legs 2. Shelves 3 are adapted to support different sized boxes 4 of commercially available sheets of wrapping material such as heat sealable cellophane cut in diamond shape. An extension bar 5 slidable in the top surface of the table at the rear or left end thereof supports one of the larger boxes at approximately the same position on the table. It will be understood that the operator selects the size of wrapper sheet to wrap the particular packages being handled. Intermediate of its ends the table top 1 has a transversely extending slot or trough 6 formed therein with a flat cross bar 61 at its bottom. Immediately to the rear or left of the groove 6 are two holes 7 for stop lugs 8. Near the front or right edge of the table is a transverse slot 9 for a heated sealing plate 10. Openings 11 at each end of the groove 6 pass vertically reciprocable support rods or flat bars 12 that support a transverse roller 13 as will be described. The trough 6 is deep enough so that the roller is substantially completely received in the groove to bear frictionally upon a single layer or thickness of a wrapper sheet 14 wrapped around a package 15 and pressed against the bar 61, as will be described. (See FIGURE 6.)

Bracket plates 16 projecting from the right legs support the right end of the table top and have upright guideways 17 on their inner sides which retain and guide the support bars 12. The plates 16 also support bearings 18 for the cross shaft 19 which has handles 20 on each end at the outer sides of the table. A rock shaft 21 is supported by bearings 22 rearwardly of the cross shaft. The rock shaft 21 has angled crank arms 23 at each end projecting toward the support bars 12 and depending links 24 connect the crank arms to the lower end of the support bars with pivots at 25 and 26 respectively. The cross shaft 19 has crank arms 27 that are connected to intermediate positions of the cranks 23 by reversely C-shaped links 28. Pivots for the links 28 appear at 29 and 30.

From the foregoing it will be apparent that with the handles 20 in the lowered full line position illustrated, the cranks 27 will be raised raising the C-links 28, and through them the cranks 23, links 24 and support bars 12 to elevate the roller 13 well above the table 1. The elevation of the roller is such as to permit a sheet of wrapping material 14 to be passed over the largest package to be wrapped such as a chicken or rib roast of beef and easily passed underneath the raised roller as will be described. The lowered positions of the parts indicated by the dotted lines and reference numerals with suffix A position the roller in the trough 6.

A short rock shaft 31 supported by bearings 32 to the right of the roller trough 6 has crank arms 33 supporting the heated seal plate 10. An oppositely extending arm or beam 34 supports the stop lugs 8. The shaft 31 and arms 33 and means 34 are oscillated by a depending crank 35 connected by a link 36 with a short crank 37 on the rock shaft 21. This causes the stops 8 to move up and the heater 10 to go down when the roller 13 is raised.

The reverse C-shape of the links 28 places the pivots 29 and 30 on the rear side of the cross shaft 19 when the roller is raised so that the weight of the roller and connected support bars 12 which is substantial, tends to rotate the cranks 27 counterclockwise locking the links 28 against shaft 19. The linkage is thus self-locking in the raised position of the roller.

In order to leave the operator's hands free to manipulate the package and wrapper, means are provided for lowering the roller other than by manipulation of the handles 20. Short crank arms 38 on the cross shaft are disposed in slots formed in the ends of push bars 39. The push bars extend rearwardly to cranks 40 pivoted on the underside of the table. Spring biased push rods 41 extending through the sides of the table and provided with buttons 42 on their outer ends are provided with pins 43 engaged in notches 44 in the cranks. Bias springs for the bars are shown at 45. By bumping either button 42 with his hip the operator can push the cranks 38 and cross shaft 19 past center so that roller 13 falls by gravity into the trough 6.

The cycle of operation of the machine is as follows:

The operator lowers a handle 20 at either side of the machine thus raising the roller 13. A sheet 14 of wrapping material is laid flat on the table behind the roller and a package 15 to be wrapped is placed over the front corner of the wrapper as shown in FGURES 4A and 5A and against the stop lugs 8 as shown in FIGURE 6. The roller 13 being raised out of the way, the operator swings or loops the trailing edge of the wrapper forwardly over the package and across the trough 6 as shown in FIGURES 4B and 5B. Note that the operators hand need not project under the roller to do this. The operator then bumps the knob 42 and the roller 13 falls by gravity pressing the over folded end of the wrapper into the trough 6 as shown in FIGURES 5C and 6. The roller exerts a yieldable tension on the wrapper 14 as the operator next slides the package forwardly over the roller 13. This folds the over folded edge of the wrapper snugly over the package and back under the bottom of the package and forms a first bottom fold and overlap as shown at 46 in FIGURES 4D and 5D and a simple sliding motion passes the overlap forwardly and backwardly over the sealing plate 10 sealing the first overlap.

The package, now with a tubular wrapper may be left open at the ends but is often returned over the still lowered roller to the rear side of the top lugs 8 and the roller is raised as in FIGURES 4E and 5E. Relowering the roller and advancing the package again forms a second or end overlap 47 which is sealed on the hot plate in the same manner as the first underlap. (See FIGURES 4F and 5F). The package is again reversed as in FIGURES 4G and 5G and the process repeated to form the finished package with all four sides of the wrapper lapped under the package and sealed to each as in FIGURES 4H and 5H.

At no time is it necessary to lift the package off of the table and after the initial positioning of the flat sheet and package and the wringing of the sheet over the package as in FIGURE 5B, the entire operation is a sequence of sliding operations back and forth over the roller and the heated seal plate. The finished package may be disposed of to any suitable receiving rack or table.

What is claimed as new is:

[1. The method of wrapping an article which comprises the steps of:

positioning a sheet of wrapping material cornerwise with its leading corner portion part way over an article receiving support, positioning an article on said support with the trailing end of the article on said leading portion and with the leading end of the article projecting on said support ahead of said leading portion, folding said sheet over the article with the initial trailing corner portion of the sheet projecting in front of the article, positioning a retaining bar in overlapped retaining engagement with the folded over projecting portion of said sheet and closely adjacent the front of the article.

advancing the article with the portion of the sheet wrapped thereover over said retaining bar and the folded over projecting corner portion of said sheet to pull the forwardly projecting portion from under said bar into underlapped relation to the forward end of said article and the initial leading corner portion of said sheet, sealing the lapped portions of said sheet, and thereafter forming overlapped side folds in the side edge of said sheet over the sides of said article.]

[2. The method of wrapping an article which comprises the steps of:

positioning a sheet of wrapping material with its leading portion part way over an article receiving support, positioning an article on said support with the trailing end of the article on said leading portion and with the leading end of the article projecting on said support ahead of said leading portion, folding said sheet over the article with the initial trailing portion of the sheet projecting in front of the article, positioning a retaining bar in overlapped retaining engagement with the folded over projecting portion of said sheet and closely adjacent the front of the article, advancing the article with the portion of the sheet wrapped thereover over said retaining bar and the folded over projecting portion of said sheet to pull the forwardly projecting portion from under said bar into underlapped relation to the forward end of said article and the initial leading portion of said sheet, and thereafter forming overlapped side folds in the side edge of said sheet over the sides of said article.]

[3. The method of wrapping an article which comprises the steps of:

positioning a sheet of wrapping material with its leading portion on an article receiving support, positioning an article on said support with the trailing end of the article on said leading portion and with the leading end of the article projecting on said support ahead of said leading portion, folding said sheet over the article with the initial trailing portion of the sheet projecting in front of the article, positioning a retaining bar in overlapped retaining engagement with the folded over projecting portion of said sheet and below the level of the article.

and advancing the article with the portion of the sheet wrapped thereover over said retaining bar and the folded over projecting corner portion of said sheet to pull the forwardly projecting portion from under said bar into underlapped relation to the forward end of said article and the initial leading portion of said sheet.]

[4. The method of wrapping an article which comprises the steps of:

positioning a sheet of wrapping material with its leading portion on an article receiving support, positioning an article on said support with the trailing end of the article on said leading portion and with the leading end of the article projecting on said support ahead of said leading portion, folding said sheet over the article with the initial trailing portion of the sheet lapped in front of the article, yieldably holding the overlapped portion independently of contact with the article and below the plane of the support and closely adjacent the front of the article, and advancing the article and the initial leading portion of the sheet by pressure applied through the folded over portion of the sheet at the back of the article over said held portion of said sheet to pull the end of the forwardly folded portion into underlapped relation to the forward end of said article and the initial leading portion of said sheet while progressively pulling out said yieldably held portion until the same is released.]

[5. The mehod of wrapping an article which comprises the steps of:

positioning a sheet of wrapping material with its leading portion on an article receiving support, positioning an article on said support with the trailing end of the article on said leading portion and with the leading end of the article projecting on said support ahead of said leading portion, folding said sheet over the article with the initial trailing portion of the sheet lapped in front of the article, yieldably holding the overlapped portion independently of contact with the article and below the plane of the support, and advancing the article and the initial leading portion of the sheet by pressure applied through the folded over portion of the sheet over said held portion of said sheet to pull the end of the forwardly folded portion into underlapped relation to the forward end of said article and the initial leading portion of said sheet while progressively pulling out said yieldably held portion until the same is released.]

[6. The method of wrapping an article which comprises the steps of:

positioning a sheet of wrapping material with its leading portion on an article receiving support, positioning an article on said support with the trailing end of the article on said leading portion and with the leading end of the article projecting on said support ahead of said leading portion, folding said sheet over the article with the initial trailing portion of the sheet lapped in front of the article, yieldably holding the overlapped portion independently of contact with the article and at about the plane of the support and adjacent the front of the article, and advancing the article and the initial leading portion of the sheet by pressure applied through the folded over portion of the sheet at the back of the article over said held portion of said sheet to pull the end of the forwardly folded portion into underlapped relation to the forward end of said article and the initial leading portion of said sheet while progressively pulling out said yieldably held portion until the same is released.]

[7. The method of wrapping an article which comprises the steps of:

positioning a sheet of wrapping material with its leading portion on an article receiving support, positoning an article on said support with the trailing end of the article on said leading portion, folding said sheet over the article with the initial trailing portion of the sheet lapped in front of the article, yieldably holding the overlapped portion independently of contact with the article and at about the plane of the support and in front of the initially leading end of the sheet, and advancing the article and the initial leading portion of the sheet by pressure applied through the folded over portion of the sheet at the back of the article over said held portion of said sheet to pull the end of the forwardly folded portion into underlapped relation to the forward end of said article and the initial leading portion of said sheet while progressively pulling out said yieldably held portion until the same is released.]

[8. The method of wrapping an article which comprises the steps of:

positioning a sheet of wrapping material with its leading portion on an article receiving support, positioning an article on said support with the trailing end of the article on said leading portion, folding said sheet over the article with the initial trailing portion of the sheet lapped in front of the article and projecting forwardly therefrom, yieldably holding the projecting portion of the sheet independently of contact with the article, and relatively moving the article and said yieldably held projecting portion of said sheet to pull the end of the forwardly folded portion into underlapped relation to the forward end of said article and the initial leading portion of said sheet while progressively pulling out said yieldably held portion until the same is released.]

*9. The method of wrapping an article which comprises the steps of:*

*placing a wrapper sheet with its leading edge on an article support,*

*next, placing the article to be wrapped on said support and the leading portion of said sheet,*

*next, folding the trailing portion of the sheet upwardly and forwardly over the back and top of the article and then downwardly across the leading end of the article,*

*and then moving the article and the over folded portion of the sheet horizontally and simultaneously relative to the end of the over folded portion of the sheet while restraining the over folded end to bring the leading and trailing ends of the sheet into lapped relation on the bottom of the article, and thereafter pulling the over folded and initially trailing edge of the sheet from its restrained position.*

*10. The method as defined in claim 9 in which the leading end of the article projects forwardly beyond the initial leading edge of the wrapper sheet.*

*11. The method as defined in claim 9 in which the end of the over folded portion of the sheet is restrained before relative horizontal movement of the article and the remainder of the wrapper sheet.*

*12. The method as defined in claim 11 in which the horizontal movement of the article takes place along and relative to the surface of said support*

*13. The method as defined in claim 12 in which the*

*restraint of the over folded end of the sheet is performed by lowering a horizontal bar from above the level of said article to below the level of the article and in front of the article before horizontal movement of the article.*

*14. The method as defined in claim 13 in which the over folded end of the sheet initially projects forwardly from said article along said support and is yieldably restrained between said support and said bar in the lowered position of the bar.*

*15. The method as defined in claim 14 in which the horizontal movement of said article is created by manual pressure applied to the trailing end of the over wrapped article.*

*16. The method as defined in claim 15 in which said restraining force is applied by selectively and manually raising and lowering said bar.*

*17. The method as defined in claim 16 in which said wrapper sheet is initially supported cornerwise on said*

*support with a corner thereof forming the initially leading end of the sheet.*

References Cited

The following references, cited by the Examiner, are of record in the patented file of this patent or the original patent.

UNITED STATES PATENTS

| | | | |
|---|---|---|---|
| 2,840,962 | 7/1958 | Stremke et al. | 53—219 X |
| 2,954,654 | 10/1960 | Arvidson | 53—219 X |
| 3,031,818 | 5/1962 | Meyer et al. | 53—206 |
| 3,222,844 | 12/1965 | Smith et al. | 53—32 |

THERON E. CONDON, *Primary Examiner.*

N. ABRAMS, *Assistant Examiner*

U.S. Cl. X.R.

53—33